United States Patent [19]
Coleman, Jr.

[11] 4,432,026
[45] Feb. 14, 1984

[54] APPARATUS AND METHOD FOR DETERMINING READ HEAD POSITION

[75] Inventor: Charles H. Coleman, Jr., Redwood City, Calif.

[73] Assignee: Ampex Corporation, Redwood City, Calif.

[21] Appl. No.: 291,344

[22] Filed: Aug. 10, 1981

[51] Int. Cl.³ .................. G11B 5/00; G11B 21/10
[52] U.S. Cl. .................................................. 360/77
[58] Field of Search ............... 360/69, 70, 75, 77, 360/78, 83, 84, 10.2; 369/43

[56] References Cited

U.S. PATENT DOCUMENTS 3,263,031 7/1966 Welsh .
4,110,799 8/1978 Bergmans et al. ............... 360/77 X
4,213,148 7/1980 Clemens ........................... 360/77 X

FOREIGN PATENT DOCUMENTS 7409513 of 0000 Netherlands .

OTHER PUBLICATIONS

Dennis A. Lindholm, "Spacing Losses in Finite Track Width Reproducing Systems", *IEEE*, vol. Mag-14, No. 2, Mar. 1978.

*Primary Examiner*—Robert L. Richardson
*Attorney, Agent, or Firm*—J. D. Talcott; E. E. Strnad; D. L. Bartels

[57] ABSTRACT

A system is described for determining the position of a magnetic read head relative to the center of a selected data track on a magnetic recording medium moving with respect to the read head. Tracking signals of equal frequency, but out of phase a predetermined fixed amount, are recorded on adjacent data tracks. The tracking signal frequency is selected to be a long enough wavelength such that a single read head positioned over a selected data track also detects the tracking signal recorded on adjacent data tracks. A phase comparator compares the phase of the tracking signal detected by the read head with respect to the phase of a reference signal of equal frequency, and a resultant signal is generated which is indicative of any deviation of the read head from the center of the selected track.

15 Claims, 7 Drawing Figures

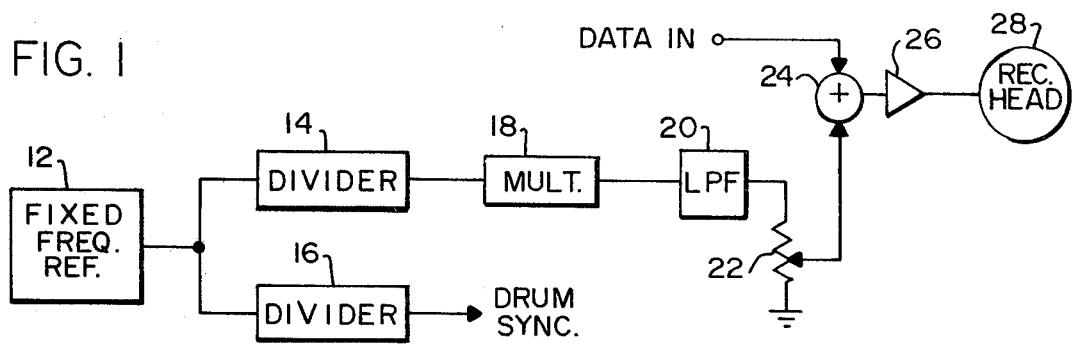
FIG. 1
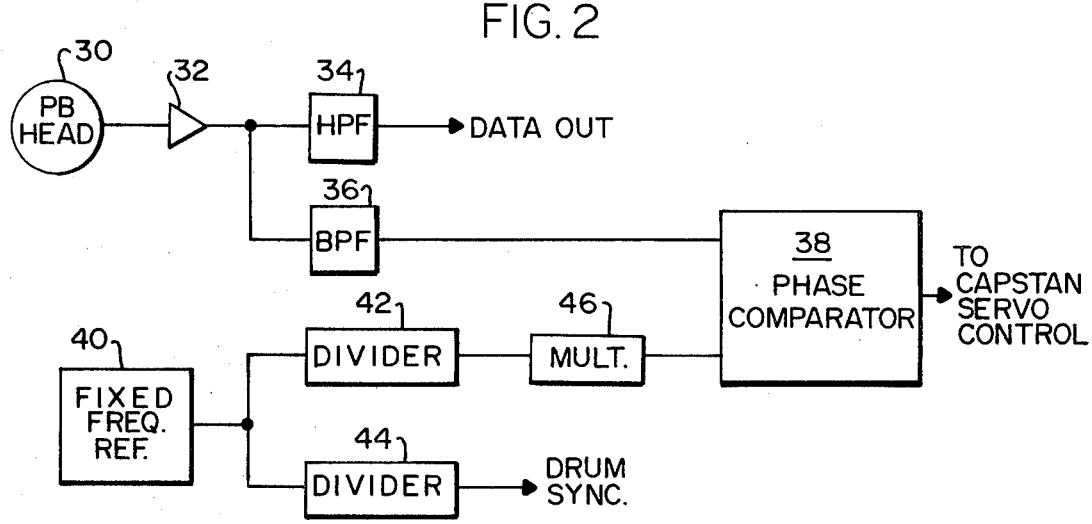
FIG. 2
FIG. 3
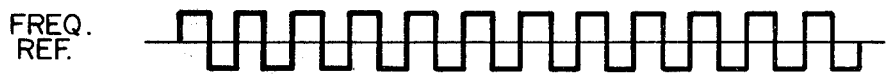
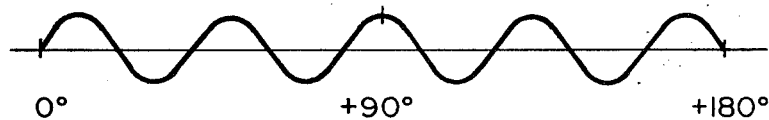

APPARATUS AND METHOD FOR DETERMINING READ HEAD POSITION

The invention described herein was made in the course of contract No. F33657-81-C-1032 awarded by the United States Government.

The present invention relates to an apparatus and method for determing the position of a magnetic read head relative to the center of a selected data track on a magnetic recording medium and, more particularly, to such a system wherein long wavelength tracking signals recorded on adjacent data tracks are of the same frequency but of a phase that is progressively shifted a predetermined fixed amount from track to track.

There are many systems known in the art for aligning a read head with respect to a data track on a magnetic recording medium moving with respect to the head. Such systems conventionally have included a separate control track, formed usually between adjacent data tracks, which is read out by a separate control head. The signal output by the control head is used to control tape position with respect to the read head. A significant problem with such systems is that it necessitates the use of a separate head and the need for separate space on the surface of the tape or other magnetic recording medium for the control track. This need for area is especially disadvantageous in systems where it is desired that storage space on the surface of the recording medium be maximized.

Another problem with such prior art systems is that they generally are not accurate enough for use with very narrow data tracks. This is due primarily to the fact that the control head usually must be located some distance from the read head, and thus is unable to correct for certain variations in head placement and, if used in a tape recorder, for variations in tape tension, temperature, humidity, or edge guiding effects.

More recent prior art systems have used a single read head to detect both data and tracking signals for controlling the position of the head with respect to the data track. U.S. Pat. No. 3,263,031 to Welsh discloses a tracking system wherein control tracks are positioned adjacent to and between each data track and wherein the frequency of the control track signal on each side of a selected data track is read simultaneously with the data track. This system apparently compares the amplitude of a higher frequency tracking signal on the one side of a selected data track with that of a lower frequency tracking signal on the other side of the data track to produce a head position error signal. This system still has the disadvantage, however, of requiring the control tracks to be recorded in an area separate from data tracks, resulting in a reduction in usable space for data storage.

Dutch patent application No. 74,09513 to Philips is similar to the Welsh patent, but eliminates the need for separate control tracks. In the Philips device, the control signals are recorded as long wavelength signals with respect to the frequencies expected in the data signal. Such long wavelength signals have the characteristic that they are detectable by a read head on an adjacent data track, assuming a properly chosen track width to wavelength ratio, whereas higher frequency data signals do not exhibit this spill-over or "read crosstalk" effect, and are therefore not read out from a read head positioned over an adjacent data track.

A significant disadvantage of both the Philips device and the Welsh device is that tracking signals comprising at least two different frequencies must be compared for generating a tracking error signal. Apparently, the Philips device operation is similar to the Welsh device in that it compares the amplitude of the detected tracking signals, once these signals have been detected by frequency selective means, to generate the head position error or deviation signal. In addition to the disadvantage inherent in a system requiring separate frequency selective circuits, the Philips device also has the disadvantage that as a read head shifts from one data track to the next, the circuitry must keep track of the different rules to be followed in each case. In other words, over one track the higher frequency tracking signal is on the left and the lower frequency tracking signal is on the right, whereas when the read head is positioned over the next adjacent data track, the high and low detected frequency tracking signals are on the opposite sides thereof. Some means is therefore necessary in the Philips device for keeping track of this frequency reversal, to insure that the deviation signal provided to the servo mechanism used to control read head position is of the proper polarity for such selected data track, to thereby insure correct alignment of the head.

Therefore, an object of the present invention is to provide a head tracking system wherein the control track signal progressively changes from track to track, rather than reversing from track to track, so that there is no need to keep track of the polarity of the resultant head alignment signal.

Another object of the present invention is to provide an improved system for increasing tracking accuracy of a read head on a magnetic recording medium so as to minimize the required width of the data tracks, to thereby substantially increase the data packing density of the magnetic medium.

A further object of the present invention is to provide an apparatus and method for positioning a magnetic read head with respect to a recording medium by comparing the phase of a detected tracking signal with respect to the phase of a reference signal, rather than being required to compare the amplitude of a signal of one frequency with that of a second signal of some other frequency.

Yet another object of the present invention is to provide an apparatus and method for determining read head position wherein the tracking signals are easily derivable from a single frequency source and readily recordable and reproducible on the same track as the data signal.

These and other object and advantages of the present invention will become more apparent upon reference to the accompanying drawings and following description in which:

FIG. 1 is a block diagram of a circuit according to the present invention for recording variable phase tracking signals on a data track;

FIG. 2 is a block diagram of circuitry according to the present invention for reading out tracking signals simultaneously with data signals on a data track and for generating a signal whose amplitude is a function of the deviation of the read head from the center of the data track;

FIG. 3 is a timing diagram of the relationship between an exemplary reference signal and a tracking signal derived therefrom;

Figure 4A:
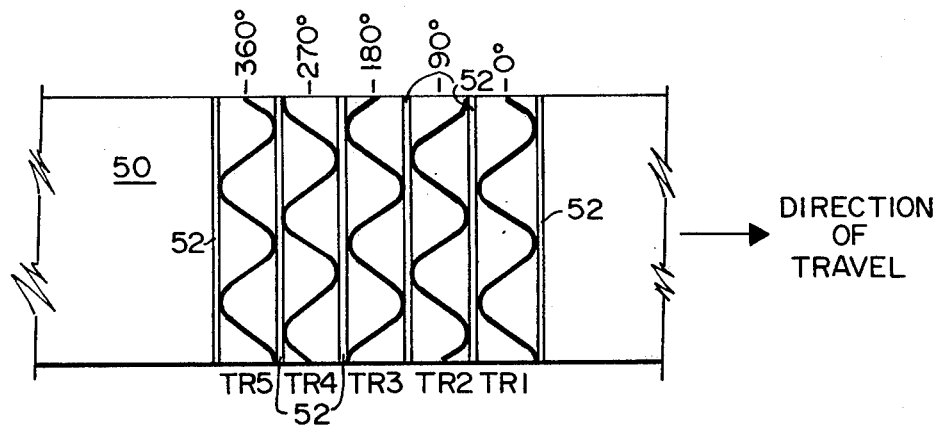
FIGS. 4A and 4B illustrate alternate methods of recording tracking signals on a magnetic recording medium according to the present invention.

Generally, the present invention operates to enable a magnetic read head to be positioned substantially over the center of a selected data track on a magnetic recording medium, such as a magnetic tape, moving with respect to the read head. Each data track is designed to include a tracking signal of equal predetermined frequency with the tracking signals on all other tracks, but wherein the tracking signals on adjacent data tracks are shifted in phase progressively a predetermined selected amount. The phase of the tracking signal detected by the read head is then compared with the phase of a reference signal. This phase comparator output comprises a signal whose amplitude is a function of any deviation of read head position from the center of the data track presently being read out by the head.

The invention herein may be defined in terms of both an apparatus and a method. The invention is particularly related and advantageous in the case of rotary head tape recording systems of either the transverse or helical type. Rotating drums having a plurality of recording and/or reproducing heads positioned thereon are also envisioned as having particular useability with the present invention. However, it will be apparent to those skilled in the art that the invention is applicable in connection with various other types of multiple track recording systems.

The advantages of the present invention are also available where the long wavelength tracking signal is linearly recorded on the data track or saturation recorded as a rectangular waveform, such as a square wave, that is time division multiplexed with the data signal on the track. The latter method may be less advantageous in certain circumstances, since this method may reduce the amount of available recording surface for data storage. However, in rotary multiple head tape recorders, there is usually a portion of each tape track that is overlapping between adjacent tape head passes across a magnetic tape. Such portions of the data track could be used for recording of saturation recorded tracking information, so that data storage area is consequently not reduced. This latter mentioned method also may be less advantageous in certain cases since it does not provide for read head tracking position correction simultaneously along with the data.

FIG. 1 is a block diagram of a preferred embodiment of a circuit according to the present invention which produces tracking signals that vary in phase in a manner corresponding to successive data tracks on a magnetic recording medium, and for recording such signals simultaneously with data on these successive data tracks. As seen in FIG. 1, a conventional fixed frequency reference signal 12 is fed to two conventional frequency divider networks 14 and 16. Frequency divider 16 divides the frequency reference signal down to a frequency usable as a synchronization pulse by a drum on which one or more rotary recording heads are mounted, as described further herein. Divider 14 feeds a conventional multiplier 18 and acts in combination therewith to provide a frequency that advances a fixed number of cycles plus a predetermined additional portion of a cycle during each pass of a rotary head across the magnetic tape recording medium.

In the preferred embodiment, the frequency of the tracking signal for each adjacent track is defined to step up or down in phase an angle of 90° always in the same direction. In a rotary head recorder, this phase shift would therefore occur once per head pass. For example, in a two head rotary system, if the drum sync frequency was 1/12 the frequency of the frequency reference signal, the tracking signal may be defined to be ⅜ of the frequency reference. In such a situation, as illustrated in FIG. 3, the tracking signal would complete 2¼ cycles during each head pass, corresponding to six cycles of the frequency reference. Other mathematical ratios can be provided, as desired, to enable other frequency ratios to be chosen and, consequently, other tracking signal frequencies to be generated. At a head-to-tape writing speed of 1000 in. per sec., a tracking signal on the order of 62.5 kHz is usable. This frequency corresponds to a wavelength of 16 mils.

Longer wavelength tracking signals in addition to enabling efficient "read cross-talk" reception from adjacent data tracks, also generally increases sensitivity and linearity of the phase versus head position relationship. That is, the accuracy of the system is a function of the sensitivity of the phase change with respect to variations in head position. Sensitivity is further increased with narrower guard bands. The guard band is defined as a band of empty space formed between adjacent tracks to provide allowance for mechanical tolerances in the system. Experimentally, a ratio of tracking signal wavelength to track width to guard band width of 4:1:⅓ was found suitable, e.g., 12 mil to 3 mil to 1 mil. Thus, for example, a mistracking of ten percent of track width would produce a phase change of 4.5°. Reducing wavelength by a factor of two would reduce sensitivity to 3.0° and impair linearity, and reducing the guard band width by a factor of two increases it to 5.6° without impairing linearity.

The output of multiplier 18 is fed to a low pass filter 20 to convert the multiplier 18 signal into a sine wave. The output of low pass filter 20 is fed to a conventional means for adjusting the level of the filter output with respect to the data signal. Such means may include a variable resistor 22. The amplitude of the tracking signal is chosen by means of resistor 22 as a compromise between the tracking system signal-to-noise ratio and the data track intermodulation effects. Ratios of 5 to 10% of peak-to-peak data signal amplitudes have been found to be satisfactory for tracking signals. The output of level adjustment means 22 is fed to a simple signal adder circuit 24, where the data signal is combined with the tracking signal. The combined signal is output through a conventional amplifier 26 to one or more recording heads 28.

FIG. 2 illustrates the method and means by which the tracking signal may be read out simultaneously with the data signal from a data track and by which the tracking signal is used to generate a signal whose value is a function of the deviation of the read head from the center of the data track. As seen in FIG. 2, the information on the recording medium is detected by a conventional playback head 30, such as one of a plurality of rotary heads in a multihead tape recorder. The output of playback head 30 is fed through a conventional amplifier 32, a high pass filter 34 and a band pass filter 36. The high pass filter 34 acts to filter out the tracking signal components of the signal detected by the playback head 30, so that only the data information is output therefrom. The band pass filter 36 is a narrow band filter which selectively outputs only signals of a frequency equal to the recorded tracking signal frequency. The output of band pass filter 36 is coupled to a phase comparator 38. Phase comparator 38 can be conventionally implemented in a number of ways, and is commercially available as part of a phase lock loop circuit such as the RCA CD4046B. The phase comparator preferably functions to output a signal whose amplitude varies as a function of the phase difference between two signals input to the comparator. Thus, with a 10° phase difference, the comparator may output a signal of 1 volt, whereas a 0° phase difference would result in 0 volts output.

The other input to phase comparator 38 is a reference signal of fixed frequency referenced to the drum synchronization signal. In one embodiment, this signal is generated from a fixed frequency reference 40 substantially similar to the fixed frequency reference source 12. The reference signal 40 is fed to dividers 42 and 44 and multiplier 46. These elements operate on the fixed frequency reference signal in the same manner as in FIG. 1.

The output of phase comparator 38 is preferably a voltage signal whose amplitude directly reflects any deviation in the position of the read head relative to the center of the data track presently selected by the recorder apparatus. This voltage can be used in a conventional manner as the control signal for a capstan servo which acts to vary the speed of the tape or other recording medium relative to the read head. Alternatively, the control signal can be used to control read head position, e.g., by controlling the bending of the head where the head is mounted on a piezoelectric or other actuator.

As can be seen from the above, the fixed frequency reference signal is designed to control the rotation rate of the recording head drum so that during both recording and playback it is locked to the same reference, with the result that the drum turns at exactly the same synchronous speed for both operations. Consequently, the playback signal should be substantially identical to what was recorded, with the exception of some minor read head time base error that may be generated. Thus, the only thing that shifts the phase of the tracking signal other than the time base error would be due to the position of the recording head with respect to the data tracks. Note that even time base error can be disregarded if the reference source is generated from signals recorded on the tape itself. Synchronizing pulses needed in conventional digital data pulse strings for example, are useable for this purpose. In such a case, time base errors on the tape recording medium are cancelled out.

The operation of the present invention can be more clearly seen with reference to FIG. 4A in which is illustrated an exemplary method of recording the tracking signals on a magnetic recording medium simultaneously with data signals according to the present invention. As seen in FIG. 4, a magnetic medium, such as a tape 50, may have a plurality of data tracks formed thereon (tracks TR1-TR4). Assume for discussion that the tape 50 is moving in the indicated direction, such that a rotating magnetic recording head would first scan in a vertical direction track TR1, then progressively tracks TR2-TR4.

As can be seen, the track TR1 exemplary tracking signal begins at a phase of 0° at the top edge of tape 50 and ends at the bottom of the tape as a phase of +90°. Track TR2 begins at +90° and ends at +180°, and so on. Thus, it can be seen that the tracking signal on track TR2 is 90° ahead of the tracking signal on track TR1. Similarly, at the end of track TR2 the signal moves to track TR3 and is 180° out of phase with track TR1 but only 90° out of phase with track TR2. Track TR5 illustrates that the tracking signals are repeatable, repeating in this case every four tracks. Although phase shifts other than 90° per channel are considered to be within the scope of the present invention, 90° is preferred.

As seen from FIG. 3, the tracking signal as recorded on tape 50 is a continuous signal which is broken up and recorded on separate tracks automatically by the action of the rotating head itself. Note also that although the data tracks on tape 50 are shown to be completely vertical, in fact they are recorded and reproduced at some small slant or angle off of the vertical due to the effect of the tape movement with respect to the axis of the vertically rotating recording head during the recording of each such track. Finally, note that a small guard band space 52 is maintained between adjacent data tracks in part to ensure that each track remains substantially isolated for signals other than the long wavelength tracking signals.

In operation, for example, if track TR2 is selected as being the track currently being read by a magnetic read head, the head will detect not only the tracking signal shown in track TR2, but also smaller amplitude amounts of the track TR1 and track TR3 tracking signals. The amplitude of the adjacent tracking signals decrease as lateral head to track spacing is increased and generally increases as the wavelength is increased. Thus, the phase of the tracking signal detected by the read head will be due not only to the phase of the tracking signal recorded on track TR2, but also due to the vector sum of the cross-talk from the tracking signals on the adjacent tracks as well. A head displacement away from the center of track TR2 increases the cross-talk signal from the nearer adjacent track and reduces it from the farther one. The phase of the detected tracking signal, as a consequence, shifts toward the phase of the nearer adjacent track by an amount proportional to the displacement. Reference is suggested to the article by Lindholm, "Spacing Losses in Finite Track Width Reproducing Systems", 1978 IEEE Transactions on Magnetics, Vol. MAG-14, No. 2.

Consequently, with the head positioned directly over the center of track TR2, since track TR1 and track TR3 are 180° out of phase with one another (one leads 90° and the other lags 90° with respect to track TR2), these adjacent track signals would cancel each other out, and the tracking signal read out by the read head would be unaffected by these other tracks. If, however, the head were shifted slightly towards track TR3, for example, the phase would be shifted towards the phase of track TR3. The output of the phase comparator would be a voltage of proper polarity to cause the capstan servo to change slightly and thereby reposition the read head directly over the center of the selected data track. It is within the scope of the present invention to have a system wherein the response time of the servo system is slow with respect to tape head scanning speed. That is, a phase error detected over a number of tracks may be necessary before head position correction is completed.

Note that the possibility of interference between the tracking signal and the data signal and vice versa imposes two requirements on the data signal. They are first that the spectrum of the signal, whether it be a coded digital data signal or a frequency modulated analog signal, should include little or no energy at the frequency of the tracking signal. Secondly, that the playback signal path should have little or no response at the tracking signal frequency. Both requirements are satisfied by conventional means.

Figure 5:
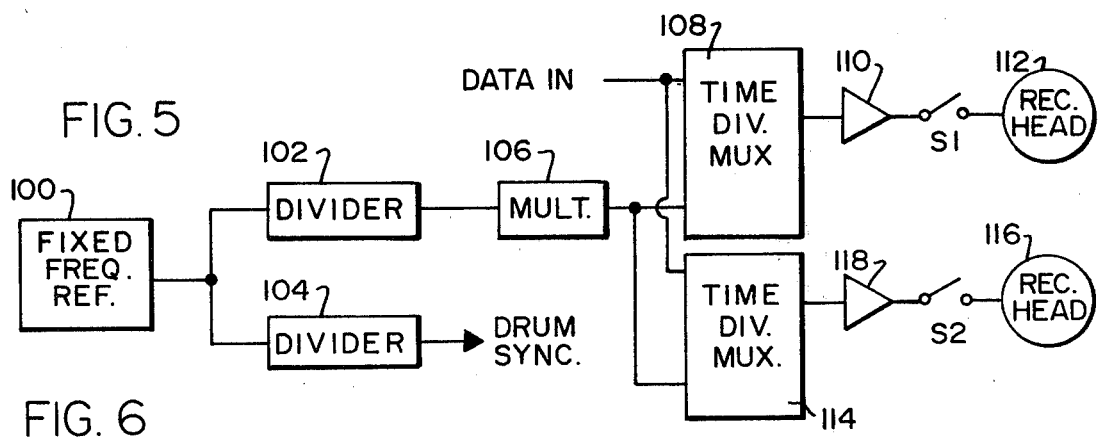
FIG. 5 is a block diagram of an alternate embodiment of a recording circuit according to the present invention.
Figure 6:
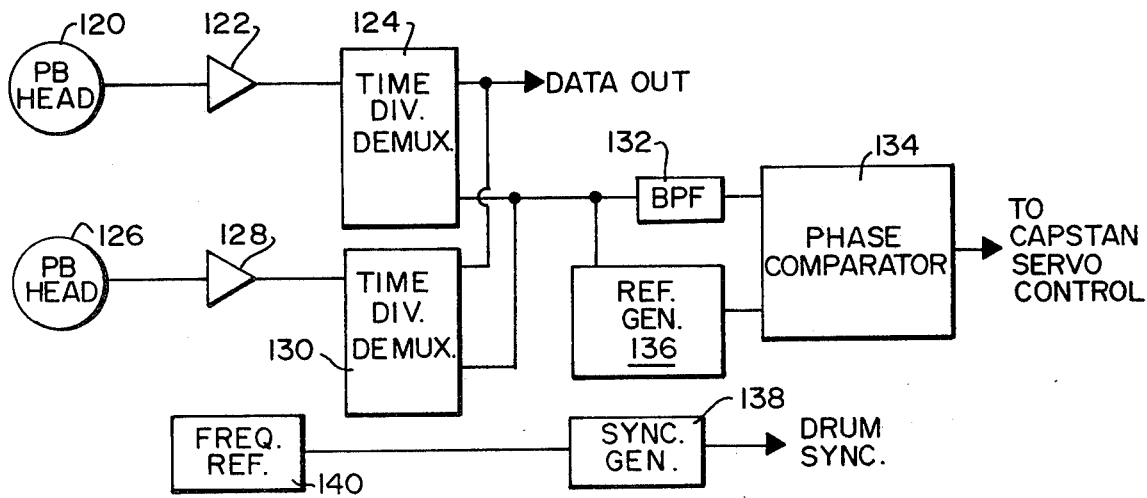
FIG. 6 is a block diagram of an alternate embodiment of a read out circuit according to the present invention.

FIGS. 5 and 6 illustrate an alternate embodiment of a tracking system according to the present invention. In this embodiment, the tracking signal is time division multiplexed on the data track with the data signal rather than being simultaneously recorded. Even though this method probably requires the use of some area on the recording medium otherwise usable for data storage, such a system still would have utility in certain circumstances. For example, if a high signal to noise ratio were required for the tracking signal, the tracking signal needs to be saturation recorded on the recording medium, rather than linearly recorded at a much lower signal amplitude. In this case, saturation recorded data could not also be simultaneously recorded. Alternatively, as described in greater detail below, tracking signals may be recorded on a tape being recorded by multiple rotary recording heads in overlapping areas when both heads are in contact with the tape, without wasting useable data storage area.

Referring now to FIG. 5, the circuit shown operates in a substantially similar manner to the circuit of FIG. 1. Included is a fixed frequency reference 100 whose output is coupled to two dividers 102 and 104, divider 104 generating a drum synchronization pulse and the output of divider 102 being fed to a multiplier 106, divider 102 and multiplier 106 acting to generate a tracking signal of predetermined progressive phase shift with respect to the drum sync pulse. The output of multiplier 106 is time divisioned multiplexed in multiplexer 108 with the data signal in a conventional manner, and the output of multiplexer 108 is fed, via an amplifier 110, to at least one recording head 112.

If recording of data on a data track via one head simultaneously with the recording of a tracking signal on a second data track is desired, a second multiplexer 114 feeding a second recording head 116 via an amplifier 118 is required. Switches S1 and S2, controlled in a conventional manner, may be needed to properly gate data or tracking signals to a respective head 112, 116. As mentioned above, this time division multiplex embodiment would be advantageous in a rotary head recording system wherein each data track includes an overlap period during which time two recording heads are in contact with the tape, one near the beginning and one near the end of their respective passes across the tape. Consequently, a train of rectangular waves of long wavelength may be recorded in this overlap space by the recording head not needed at that moment for recording data on its respective data track. This time division miltiplexed tracking signal may be read out in a corresponding manner. Note that in this embodiment, it is not necessary that the tracking signal be continuous from track to track. The number of tracking signal cycles in each data track is not important. All that is required is that the phase from track to track shift progressively by either plus or minus 90°.

FIG. 6 illustrates a circuit for reproduction of the tracking signal recorded according to the alternate embodiment described. The operation of the circuit shown in FIG. 6 is similar to the operation of the circuit of FIG. 2 with some important distinctions. The output of playback head 120 is fed, via a conventional amplifier 122, to a time division demultiplexer 124. Demultiplexer 124 acts to output the data signal from the recording medium data track at all times other than at the predetermined times during which tracking signal data is recorded on the data track. During this latter time, this signal is fed through a bandpass filter 132 to a phase comparator 134. Similarly, the output of a second playback head 126 is fed, via amplifier 128, to a demultiplexer 130, which functions to output the data in the manner as described for demultiplexer 124. Although a reference generator output signal can be generated in the same manner as FIG. 2, an alternate method would be to feed the tracking signal itself to a reference generator 136. Reference generator 136 can use the higher frequency components of the edges of the rectangular wave tracking signal for generation of the reference signal needed by phase comparator 134. This is enabled because the frequency components of these edges are not subject to phase changes as the result of position changes as is the fundamental component of the tracking signal. As in the circuit of FIG. 2, the output of phase comparator 134 is used to control a capstan servo, to thereby enable a reproduce head to be realigned over the center of the data track if such position error has been detected. In this embodiment, reference generator 136 does not also generate the drum sync signal. Consequently, a separate sync generator 138 fed from an internal frequency reference 140 is also provided.

Figure 4B:
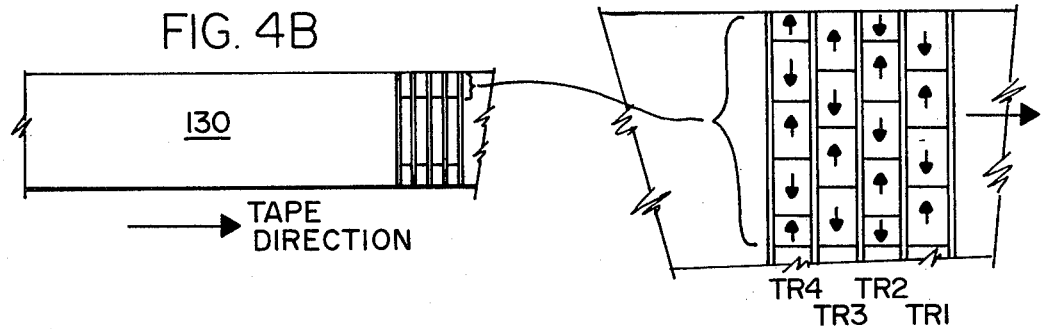

FIG. 4B illustrates an exemplary method of recording the saturation level rectangular wave according to the alternate circuit embodiment shown in FIG. 5. As seen in FIG. 4B, the plus and minus components of a square wave tracking signal are indicated on tape 130 as alternating magnetization directions. The phase of the magnetization regions again are shifted by 90° from track to track. A head would progressively read track TR1, track TR2, and so on, in a manner substantially similar to the operation of the embodiment illustrated in FIG. 4A. Thus, for example, if the magnetic read head were positioned over track TR2, it would detect the fundamental components of the tracking signals of tracks TR1 and TR3 as well as TR2 in the same manner as previously described with respect to the circuit of FIG. 2.

It is of course understood that although a preferred embodiment of the present invention has been illustrated and described, various modifications, alternatives and equivalents thereof will become apparent to those skilled in the art and, accordingly, the scope of the present invention should be defined only by the appended claims and equivalents thereof.

What is claimed is:

1. An apparatus for positioning a magnetic read head substantially over the center of a selected data track on a magnetic recording medium having a plurality of such tracks, said data track including a tracking signal of a predetermined frequency so as to enable read cross-talk of said signal on an adjacent track, comprising:

a first data track on one side of, and adjacent to said selected track having recorded therein a tracking signal of frequency equal to said selected track frequency but out of phase in one direction a predetermined amount;

a second data track on the opposite side of and adjacent to said selected track having recorded therein a tracking signal of frequency equal to said selected track frequency but out of phase in the opposite direction from said first track signal a predetermined amount;

means connected to the output of said read head for detecting a sum tracking signal having components from each said tracking signal; and means for comparing the phase of the sum tracking signal with the phase of a reference signal of the same frequency and for generating in response thereto a signal indicative of any position deviation of the read head from the center of said selected track.

2. The apparatus of claim 1 further comprising means responsive to said deviation signal for adjusting the position of said magnetic read head such that it is substantially centered over said selected data track.

3. The apparatus of claim 1 wherein said predetermined phase shift between each adjacent track equals 90°.

4. The apparatus of claim 1 or 3 wherein said predetermined phase shift is progressive and of equal amount on successive data tracks scanned by said read head.

5. The apparatus of claim 1 wherein the magnetic read head comprises a rotary head mounted on a rotary drum for transversely scanning the data tracks on such recording medium and wherein said reference signal is in synchronization with the speed of rotation of said drum.

6. The apparatus of claim 1 wherein the magnetic read head helically scans the data tracks on said recording medium.

7. The apparatus of claim 1 wherein said detecting means comprises band pass filter means for filtering out signals of any frequency other than the frequency of said tracking signals.

8. An apparatus for positioning a magnetic read head relative to a selected data track on a magnetic recording medium having a plurality of such tracks, said selected data track including a tracking signal of a predetermined long wavelength frequency so as to enable read cross-talk of said signal on an adjacent data track, comprising:

a first data track on one side of, and adjacent to said selected track having recorded therein a tracking signal of frequency equal to said selected track frequency but out of phase in one direction a predetermined amount;

a second data track on the opposite side of and adjacent to said selected track having recorded therein a tracking signal of frequency equal to said selected track frequency but out of phase in the opposite direction from said first track signal the same predetermined amount;

means for sensing the relative strengths of said tracking signals and for outputting a sum signal whose phase is a function thereof; and phase comparator means for outputting a signal whose value varies as a function of the difference in phase detected between said sum signal and a reference signal of the same frequency.

9. The apparatus of claim 8 wherein said tracking signals are of an amplitude in a range of 5-10% of peak-to-peak data signal amplitude.

10. An apparatus for positioning a magnetic read head substantially over the center of a selected data track on a magnetic recording medium having a plurality of such tracks, said selected data track including a tracking signal time division multiplexed with data on said data track, said tracking signal of a predetermined long wavelength frequency so as to enable cross-talk of said signal on an adjacent data track, comprising:

a first data track on one side of, and adjacent to said selected data track having recorded therein a corresponding time division multiplexed tracking signal of frequency equal to said selected tracking signal frequency but out of phase in one direction a predetermined amount;

a second data track on the opposite side of and adjacent to said selected data track having recorded therein a corresponding time division multiplexed tracking signal of frequency equal to said selected tracking signal frequency but out of phase in the opposite direction from said first tracking signal the same predetermined amount;

means connected to the output of said read head for demultiplexing a composite tracking signal from said selected track data signal, said composite tracking signal having components of each said data track tracking signal; and means for comparing the phase of the composite tracking signal with the phase of a reference signal of the same frequency and for generating in response thereto a signal indicative of any position deviation of the read head from the center of said selected track.

11. The apparatus of claim 10 wherein each said tracking signal is saturation recorded as a rectangular waveform on said data tract.

12. A method for positioning a magnetic read head substantially over the center of a selected data track moving relative to said read head on a magnetic recording medium having a plurality of such tracks, each said data track including a tracking signal of equal frequency and of a long wavelength such that cross-talk of said tracking signals on adjacent data tracks is enabled, each said tracking signal being progressively out of phase a predetermined amount with its next succeeding data track, comprising the steps of:

(a) positioning said read head relative to said selected data track;

(b) sensing from the output of said read head a composite tracking signal having components from each said tracking signal;

(c) comparing the phase of said composite tracking signal with a reference signal of the same frequency; and (d) outputting in response to any detected phase difference between said composite tracking signal and said reference signal a signal whose value is a function of the magnitude of said phase difference.

13. The method of claim 12 wherein the tracking signal on each said data track is out of phase 90° with its adjacent data track tracking signal.

14. The method of claim 12 wherein said reference signal is derived from the predetermined rate at which each data track is scanned by a magnetic read head.

15. The method of claim 12 wherein step (d) further comprises the step of outputting a signal whose amplitude is proportional to the distance the read head is offset from the center of said selected data track.

* * * * *